Patented Nov. 11, 1947

2,430,585

UNITED STATES PATENT OFFICE 2,430,585

LUBRICATED PHOTOGRAPHIC FILM AND PROCESS OF PREPARATION

John Russell and Robert C. Houck, Rochester, N. Y., assignors to Eastman Kodak Company, Rochester, N. Y., a corporation of New Jersey No Drawing. Application March 1, 1944, Serial No. 524,632

2 Claims. (Cl. 88—19.5)

This invention relates to process for preparing lubricated photographic film and to the improved film resulting therefrom.

Our invention finds its greatest utility in connection with the preparation of lubricated motion picture film. However, it is useful for the preparation of photographic film of any kind which frictionally engages the parts of the apparatus in which it is used. It is known that photographic film becomes scratched and worn during use in projection and like apparatus. Also the perforations wear and become torn. Previous investigators have found that these undesirable results can be avoided to a certain extent by applying lubricants, such as waxes, fats, oils, etc., to the film. This is not a complete solution of the problem. The lubricants thus applied are removed by cleaning solvents; the lubricants become imbedded or mixed with dirt and they clog the apparatus in which the film is used.

This invention has for its object to provide improved lubricated photographic film and improved methods for preparing the same. Another object is to provide procedure for preparing lubricated film which does not involve the application of a readily removable lubricant. A further object is to provide improved lubricated photographic film, the lubricant layer of which is an integral part of the film. Other objects will appear hereinafter.

These and other objects are accomplished by our invention which includes treating the photographic film with a substance which will react with at least one of the outside surfaces of the film to form a lubricant. In this way a lubricant is formed which permeates the pores and interstices of the outside surface or surfaces of the film and is actually an integral part of the film.

Most photographic film comprises a gelatin layer carried by a cellulose derivative support. Our invention is of particular value in connection with the treatment of such photographic films. However, numerous substitutes for gelatin are known and other supports or carriers are quite widely used. We, therefore, include within the scope of our invention the lubrication in the manner specified of all such films, specific examples of which are cellulose nitrate, acetate, ethyl cellulose, partial polyvinyl acetal, etc., supports coated on one or both surfaces with gelatin, polyvinyl acetals, hydrolized cellulose esters, hydrolized polyvinyl acetates, etc., which will usually contain the silver image.

The photographic film can be treated to cause reaction of either or both outside surfaces with the lubricant-forming substance. We prefer to lubricate both surfaces. However, the layer bearing the photographic image is the most important one to protect and if only one surface is coated, it is preferable that this be the coated surface. The formation of the lubricant on the outside surface or surfaces is accomplished by treating the film with a substance or substances which will chemically react with the material composing the film surface to form the lubricant. Examples of satisfactory substances for forming the lubricant on the film surface are high molecular weight fatty substances or their derivatives which react with the film such as palmityl chloride, stearyl chloride and cetyl sulphonyl chloride.

The reaction to form the lubricating layer can be brought about by simply treating the film with the agent, preferably dissolved in a solvent. Reaction is somewhat more rapid if applied to the film shortly after it has been treated in the processing bath and before it has been completely dried. Also it has been found desirable in certain cases to subject the film to a preliminary treatment to raise its pH so that the reaction takes place more completely and rapidly. The reactant can be applied to the film by squeegee treatment or the film may be immersed in or sprayed with the lubricant-forming reagent.

The following examples illustrate the method of carrying out the invention and the improved lubrication obtained:

EXAMPLE I

Processed Positive Safety Film comprising a gelatin layer bearing a photographic image and supported by cellulose acetate propionate was developed, fixed, washed and dried in the usual manner. A sample of this film was then treated by squeegeeing a solution of 4 grams of palmityl chloride in 500 cc. of carbon tetrachloride on the base side and the emulsion side. The thus treated samples were then compared with an untreated sample to determine their coefficients of friction. All samples were dried and conditioned at 50% relative humidity. The results are given in Table I:

*Table I.—Safety-positive film*

| | Treatment | Coefficient of Friction (50% Relative Humidity) | |
|---|---|---|---|
| | | Base Side | Emulsion Side |
| 1 | Regular Process | 0.30 | 0.30 |
| 2 | Regular Process+squeegee with palmityl chloride | 0.30 | 0.21 |

EXAMPLE II

Samples of the untreated but processed Safety-Positive Film used in Example I were soaked for one minute in 1% sodium carbonate solution and were washed one minute with water. One of these samples was then squeegeed with 3 cc. of palmityl chloride dissolved in 500 cc. of carbon tetrachloride. A sample of the film which had not been treated with sodium carbonate solution was also squeegeed with the palmityl chloride solution. Samples of untreated film and treated film were then tested for coefficient of friction after conditioning at 50% relative humidity. The results are given in Table II:

*Table II*

[Film squeegeed with 3 cc. palmityl chloride/500 cc. CCl₄]

| Treatment | pH of Processed emulsion before palmityl chloride treatment | Method of applying palmityl chloride | Coefficient of Friction (50% relative humidity) | |
|---|---|---|---|---|
| | | | Base | Emulsion |
| Regular Process (blank) | ca 8 | | .30 | .32 |
| Regular Process and palmityl chloride solution | ca 8 | Squeegee | 0.25 | .21 |
| Regular Process+1 min. soak in 1% Na₂CO₃ 1 min. wash | 10–11 | | 0.30 | .34 |
| Regular Process+Na₂CO₃ treatment and palmityl chloride solution | 10–11 | Squeegee | 0.21 | 0.15 |

These results indicate that the alkaline treatment has caused an increased lowering of friction on both sides and especially on the base side. The extent of this lowering will depend upon the method of treatment such as the time of washing between the carbonate bath and the palmityl chloride treatment.

EXAMPLE III

A sample of the regularly processed film was immersed for one minute in a 1% sodium carbonate aqueous solution. This sample was then squeegeed with a solution containing 3 cc. palmityl chloride in 500 cc. carbon tetrachloride and was then washed repeatedly with carbon tetrachloride. This washed film and a sample of untreated film were adjusted to 50% relative humidity and the coefficient of friction of both samples then determined. The results are given in Table III:

*Table III*

| Treatment | pH of emulsion before palmityl chloride treatment | Coefficient of Friction (50% relative humidity) | |
|---|---|---|---|
| | | Base Side | Emulsion Side |
| Regular Process (blank) | ca 8 | 0.30 | 0.32 |
| Regular process + 1.0 min. Na₂CO₃+palmityl chloride squeegee and washing with CCl₄ | ca 10–11 | 0.21 | 0.15 |

It is seen that the palmityl chloride is combined with both sides of the photographic film and is not removable by treatment with solvents.

EXAMPLE IV

Samples of the films indicated below in Table IV were given a regular processing followed by one minute soaking in 1% sodium carbonate followed by a two minute wash in water and a final squeegee in a 1% palmityl chloride solution in carbon tetrachloride. Table IV gives the coefficient of friction tests on control samples, on samples treated as described and on samples treated as described and then washed with carbon tetrachloride.

*Table IV*

| Base | Emulsion | Lubricant | Coefficient of Friction | |
|---|---|---|---|---|
| | | | Base | Emulsion |
| Cellulose nitrate 11.9% nitrogen | Cine Positive | | 0.25 | 0.34 |
| Do | do | Palmityl chloride | 0.20 | 0.17 |
| Do | do | Palmityl chloride after soaking in CCl₄ | .17 | .17 |
| Triacetate 44.7% acetyl | Cine Positive | | 0.31 | 0.25 |
| Do | do | Palmityl chloride | .18 | .17 |
| Do | do | Palmityl chloride after soaking in CCl₄ | .20 | .17 |

What we claim is:

1. The process of preparing an improved lubricated motion-picture film which comprises treating processed motion-picture film which includes a gelatin layer carried by a base with a high molecular weight fatty acid chloride whereby the chloride chemically reacts with the gelatin to form a lubricant layer integral therewith.

2. As a new article of manufacture processed motion-picture film comprising a base carrying a gelatin layer, the surface of which layer is comprised of the reaction product of gelatin and a high molecular weight fatty acid chloride.

JOHN RUSSELL.
ROBERT C. HOUCK.

(References on following page)

REFERENCES CITED

The following references are of record in the file of this patent:

UNITED STATES PATENTS

| Number | Name | Date |
|---|---|---|
| 1,589,688 | Hagedorn et al. | June 22, 1926 |
| 1,697,858 | Fiedler | Jan. 8, 1929 |

FOREIGN PATENTS

| Number | Country | Date |
|---|---|---|
| 4,295 | Great Britain | Dec. 14, 1874 |